(12) United States Patent
Hafner et al.

(10) Patent No.: US 12,651,979 B2
(45) Date of Patent: Jun. 9, 2026

(54) METHOD FOR CONTROLLING OPERATION OF A CELL IN AN MMC

(71) Applicant: Hitachi Energy Ltd, Zürich (CH)

(72) Inventors: Ying-Jiang Hafner, Ludvika (SE);
Rakesh Reddy, Markapur (IN);
Ashkan Nami, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 192 days.

(21) Appl. No.: 18/754,048

(22) Filed: Jun. 25, 2024

(65) Prior Publication Data

US 2025/0007426 A1 Jan. 2, 2025

(30) Foreign Application Priority Data

Jun. 27, 2023 (EP) ..................................... 23181770

(51) Int. Cl.
*H02M 7/483* (2007.01)
*H02M 1/32* (2007.01)
*H02M 7/797* (2006.01)

(52) U.S. Cl.
CPC ............. *H02M 7/797* (2013.01); *H02M 1/32* (2013.01); *H02M 7/483* (2013.01); *H02M 7/4835* (2021.05)

(58) Field of Classification Search
CPC ...... H02M 7/48; H02M 7/483; H02M 7/4833; H02M 7/4835; H02M 7/53871;
(Continued)

(56) References Cited

U.S. PATENT DOCUMENTS 10,734,916 B2 * 8/2020 Shinomiya .............. H02M 1/32
10,819,215 B2 * 10/2020 Santi ....................... H02M 1/32
(Continued)

FOREIGN PATENT DOCUMENTS

EP 3116118 A1 1/2017
EP 3614543 A1 2/2020
(Continued)

OTHER PUBLICATIONS

Dorn et al., "Transformation of the Energy System in Germany—Enhancement of System Stability by Integration of innovative Multilevel HVDC in the AC Grid", Internationaler ETG-Kongress 2013 Nov. 5-6, 2013 in Berlin, ISBN 978-3-8007-3550-1, 6 pages.

*Primary Examiner* — Thienvu V Tran
*Assistant Examiner* — Shahzeb K Ahmad
(74) *Attorney, Agent, or Firm* — PROCOPIO, CORY, HARGREAVES & SAVITCH LLP

(57) ABSTRACT

The present application relates to a method for controlling operation of a cell arranged in an arm of a voltage source converter, said arm being associated with a current phase in said voltage source converter. The cell may be a half-bridge or full-bridge cell. The method may comprise: upon detection of a predetermined fault type in the cell, depending on an average current in said arm during one period of fundamental frequency and on an operation mode of the voltage source converter, injecting a pre-defined circulating current into said arm; detecting a time period during which the arm current is in a negative arm current direction corresponding to a direction when arm current flows via a diode of a switch connected in parallel to a bypass switch, and controlling the bypass switch such that it closes within said time period. A control unit and voltage source converter are also provided.

18 Claims, 7 Drawing Sheets

(58) Field of Classification Search
CPC .. H02M 7/797; H02M 1/0003; H02M 1/0009;
H02M 1/0016; H02M 1/32; H02M 1/36;
H02J 3/36
See application file for complete search history.

(56) References Cited

U.S. PATENT DOCUMENTS

| | | | | |
|---|---|---|---|---|
| 2014/0002933 | A1* | 1/2014 | Gao | H02M 1/32 |
| | | | | 361/18 |
| 2014/0097804 | A1 | 4/2014 | Hasler | |
| 2015/0333660 | A1* | 11/2015 | Kim | H02M 7/483 |
| | | | | 363/123 |
| 2018/0302003 | A1* | 10/2018 | Mori | H02M 7/17 |
| 2019/0131867 | A1* | 5/2019 | Ishii | H02M 1/32 |
| 2023/0056080 | A1* | 2/2023 | Kajiyama | H02M 1/0025 |

FOREIGN PATENT DOCUMENTS

| | | | | | |
|---|---|---|---|---|---|
| WO | 2017203865 | A1 | 11/2017 | | |
| WO | WO-2022037783 | A1 * | 2/2022 | | H02M 7/4835 |

* cited by examiner

METHOD FOR CONTROLLING OPERATION OF A CELL IN AN MMC

CROSS-REFERENCE TO RELATED APPLICATIONS

The present application claims priority to European Patent Application No. 23181770.1, filed on Jun. 27, 2023, which is hereby incorporated herein by reference as if set forth in full.

TECHNICAL FIELD

The present application is directed to the field of power converters, specifically Voltage Source Converters (VSCs). It is more particularly concerned with a method for reducing, preferably minimizing, cell bypass component stress in a VSC. The present application also relates to a control unit for performing the method and a voltage source converter incorporating cells and the control unit.

BACKGROUND

High Voltage Direct Current, HVDC, electric power transmission systems are used to transfer electric power in an efficient manner. HVDC systems relies on HVDC converters for converting electric power from high voltage alternating current, HVAC, to HVDC or vice versa. One such HVDC converter are known as voltage-source converters, VSCs, which uses transistors to perform said conversion.

Due to erroneous behavior of HVDC VSC systems, it may be necessary to mechanically bypass one or more cells of the HVDC VSC system. This may be done by closing a mechanical bypass switch. During this operation, however, there is a risk that one or more switches of the HVDC VSC system does not operate as intended, which may lead the bypass switch to be subjected to abnormally large Mega Ampere, MA, short circuit currents. For this reason, the bypass switch must be designed to sustain MA short circuit current. Available solutions on the market, such as the vacuum breaker, are typically designed to sustain only small kA short circuit currents, so the bypass switch for HVDC VSC systems must be specially designed which leads to increased costs.

In view of the above, it is desirable to provide a solution for reducing, preferably minimizing, bypass component stress in a more cost-efficient manner.

SUMMARY

It is an object of disclosed embodiments to provide an improved solution that alleviates the mentioned drawbacks with present solutions. Furthermore, a first object of certain disclosed embodiments is to provide a method for controlling operation of a cell arranged in an arm of a voltage source converter, said arm being associated with a current phase in said voltage source converter. The first object is solved by claim 1. A second object of certain disclosed embodiments is to provide a control unit for performing such a method. The second object is solved by claim 14. A third object of certain disclosed embodiments is to provide a voltage source converter comprising a plurality of cells and a control unit as mentioned. The third object is solved by claim 15.

Certain disclosed embodiments are based on the inventive concept that, in the event of a cell fault in a voltage source converter for which a cell needs to be bypassed, cell operation may be controlled in a particular way to limit or prevent Mega Ampere, MA, short circuit currents from conducting through cell bypass components, such as a bypass switch. Stress experienced by the cell bypass components may then be reduced, thereby improving longevity. Moreover, cell bypass components dimensioned for MA short circuit currents are costly. Since the inventive concept involves limiting the short circuit current, it allows for cell bypass components to be dimensioned for smaller short circuit currents, thereby reducing costs.

A cell may comprise one or more energy storage elements (such as capacitors) and one or more switches for controlling operation of the cell. Said switches may comprise a transistor for conducting current when the transistor is turned ON and an anti-parallel diode for conducting current when the transistor is turned OFF. By turning a transistor of a switch ON/OFF, the switch state is impacted. By switch being turned ON/OFF, it should be understood as the switch's transistor being turned ON/OFF. A switch turned OFF may still conduct current via the anti-parallel diode.

When a cell fault occurs in a voltage source converter, one or more cells may have to be bypassed. A cell may comprise a bypass switch enabling the cell to be bypassed. By cell being bypassed, it may be meant that an energy storage element of the cell is bypassed by the bypass switch. One or more switches of the cell may be turned OFF before the bypass switch is closed. In the case of the cell comprising a switching branch including a pair of switches connected in series wherein the bypass switch is connected in parallel with one of the switches, it may be desired to place the cell in a soft-bypass mode prior to closing the bypass switch. Soft-bypass mode means that the parallel switch is ON, and the other switch is turned OFF. As long as the parallel switch can be turned on, the bypass switch will not experience any high short circuit current from cell capacitor discharging.

However, a cell fault may result in the parallel switch to not operate as intended which may prevent the parallel switch from being turned ON, thus preventing the cell to be placed in soft-bypass mode.

Certain disclosed embodiments are capable of reducing cell bypass components stress and are capable of reducing cell bypass component stress in particular when the cell cannot be placed in soft-bypass mode before closing of a bypass switch.

According to a first aspect, a method is provided for controlling operation of a cell arranged in an arm of a voltage source converter, said arm being associated with a phase of arm current in said voltage source converter.

The cell for which operation thereof is controllable by the method is a cell that comprises:
- a first cell connection terminal;
- a second cell connection terminal;
- a first switching branch comprising a first switch and a second switch connected in series, wherein one of the first and second cell connection terminals is arranged between the first switch and the second switch, the first and second switches each comprising a transistor and an anti-parallel diode;
- a bypass switch connected between the first and second cell connection terminals and connected such that the first switch or the second switch is connected in parallel with the bypass switch;
- wherein the cell is adapted such that when the transistors of both the first and second switches are turned off, the cell conducts an arm current between the first and second cell connection terminals via the diode of the switch connected in parallel with the bypass switch for a negative arm current direction of the arm current and via the diode of the other switch of the first and second switches for a positive arm current direction of the arm current.

The method for controlling said cell comprises:

upon detection of a predetermined fault type in the cell, depending on an average current in said arm during one period of fundamental frequency and on an operation mode of the voltage source converter, injecting a pre-defined circulating current into said arm;

detecting a time period during which the arm current is in the negative arm current direction, and controlling the bypass switch such that it closes within said time period.

By this method, stress in cell bypass components may be reduced, preferably minimized. This increases longevity of cell bypass components. In particular, use of the method reduces stress in cell bypass components in particular when a cell fault occurs, which prevents the parallel switch from being turned ON. The method allows for cell bypass components, in particular bypass switch, to be designed to withstand smaller short circuit currents. The bypass switch can thus be made less complex and smaller, which reduces cost.

The first cell connection terminal may be arranged between the first switch and the second switch. The second cell connection terminal may be arranged between the first switch and the second switch.

The switch connected in parallel with the bypass switch may be the first switch or the second switch.

The bypass switch is in one embodiment a mechanical bypass switch. The bypass switch may be dimensioned to be capable of withstanding short circuit currents having a magnitude of 100 A-1 kA, 1 KA-10 KA, 10 KA-100 KA, 100 kA-1 MA, 1 MA-10 MA, or more.

The negative arm current direction may be defined as a direction from the first cell connection terminal to the second cell connection terminal. The positive arm current direction may be defined as a direction from the second cell connection terminal to the first cell connection terminal. It may however be the opposite. Arm current flowing in the negative arm current direction may have negative value, thereby providing "negative arm current". Arm current flowing in the positive arm current direction may have positive value, thereby providing "positive arm current". Preferably, the cell may be adapted so that when the arm current is negative, the negative arm current flows via the diode of the parallel switch when both switches are turned OFF.

A cell fault may be detectable based on analysis of the arm current. For instance, arm current may deviate from an expected behavior. By this, a cell fault may be inferred to have occurred. A cell fault may be inferred to have occurred if an average current in said arm during one period of fundamental frequency deviates from a reference average current in said arm. Alternatively, or in combination, a cell fault may be detectable by means of one or more sensors arranged to sense one or more properties of the cell. A cell fault may be detected by monitoring the behaviors of any components in the cell and detecting any abnormalities.

By fundamental frequency, it may be meant the lowest frequency of a periodic waveform. In terms of a superposition of sinusoids, the fundamental frequency may be the lowest frequency sinusoidal in the sum of harmonically related frequencies, or the frequency of the difference between adjacent frequencies. Thus, one period of fundamental frequency may be a period for such a frequency.

Analysis of the arm current may involve averaging the arm current over a period of a fundamental frequency of the arm current. In addition, or alternatively, by fundamental frequency it may be meant a connected AC frequency, e.g., 50 Hz or 60 Hz.

By injecting a pre-defined circulating current, it may be meant a current is injected to affect existing circulating current in the cell, e.g., including arm current. The injecting of circulating current may be realized by modifying a circulating current reference, and control unit for controlling circulating may control the circulating to follow the reference value. The circulating current may be injected by application of a delta voltage added to a voltage reference of the corresponding phase.

Said injection of circulating current may be dependent on an average current in said arm during one period of fundamental frequency and on operation mode of the voltage converter. The condition of dependent on an average current in said arm during one period of fundamental frequency may mean if the average current in said arm during one fundamental frequency deviates from a reference average current in said arm during one fundamental frequency and deviates by a threshold average current value. The condition of dependent on operation mode of the voltage converter may mean whether or not the voltage source converter is in rectifier mode (meaning transferring power from AC into DC). When the voltage source converter is in rectifier mode, injecting a circulation current may not be required due to an average charging current being below zero.

According to one embodiment, said injecting a pre-defined circulating current into said arm is performed if the converter is operating in inverter mode, optionally at a power level of, or higher than, 0.2 PU voltage. Optionally, the power level may be in an interval of 0.2 PU voltage-0.3 PU voltage, 0.3 PU voltage-0.4 PU voltage, or 0.4 PU voltage-0.5 PU voltage, or more. By this, it makes it possible to limit cell voltage increasing when the cell is experiencing a fault without proper control even if the bypass switch is not closed as soon as a cell fault is detected.

According to one embodiment, said injecting a pre-defined circulating current into said arm is performed before the bypass switch is closed. By this, cell charging may be limited prior to the bypass switch is closed. This may further reduce a short-circuit current due to a discharge current from the energy storage element.

According to one embodiment, the negative arm current direction is a direction for negative arm current and the positive arm current direction is a direction for positive arm current. The switch connected in parallel with the bypass switch may conduct arm current in OFF state via the anti-parallel diode for negative arm current direction. This may be a suitable configuration depending on cell design.

According to one embodiment, the method comprises:

providing an arm current measurement measured by means of a current sensor, and determining arm current direction of the arm current from the arm current measurement.

By measuring the arm current by means of a current sensor, it may be possible, depending on sensor position, to determine which cell of a plurality of cells in an arm has experienced a fault. The method may comprise providing an arm current measurement measured by means of a plurality of current sensors, each of which are arranged in association with a respective cell. Arm current direction may be determined based on arm current polarity. If the arm current polarity is negative, then the arm current direction may be determined as negative arm current direction. If the arm current polarity is positive, then the arm current direction may be determined as positive arm current direction. By measuring the arm current and arm current direction specifically, the present method may result in more responsive and accurate performance. Reliance on inferring arm current and arm current direction from related measurements (e.g., power output) may be foregone.

According to one embodiment, said controlling the bypass switch such that it closes within said time period includes:

sending a control signal to the bypass switch to close the bypass switch, and timing the control signal so that it compensates for a transmission time of the control signal and a closing time of the bypass switch.

By this, it may be ensured that the bypass switch does not close when the parallel switch in OFF-state conducts in the second direction, which may result in stress of cell bypass components. The closing time of the bypass switch may depend on the type of bypass switch and variation thereof. The transmission time of the control signal may depend on the distance from a source of the control signal to a target of the control signal. When the control signal is received by the target, the bypass switch may be actuated to close.

According to one embodiment, said timing the control signal includes:

sending the control signal to the bypass switch during a time period when the arm current direction of the arm current is in the positive arm current direction, controlling the bypass switch such that it closes when the arm current direction of the arm current is in the negative arm current direction.

By this, the window of time for when the bypass switch may be closed without resulting in avoidable stress in cell bypass components is increased. Thus, margin of safety for proper operation is increased.

According to one embodiment, the method comprises:

based on a waveform of the arm current, estimating a first zero-crossing timepoint corresponding to a timepoint when the arm current direction changes from the positive arm current direction to the negative arm current direction and a second zero-crossing timepoint corresponding to a timepoint when the arm current direction changes from the negative arm current direction to the positive arm current direction, and sending a control signal to close the bypass switch such that the bypass switch closes no earlier than at the first zero-crossing timepoint and no later than at the second zero-crossing timepoint.

According to one embodiment, said predetermined fault type is a loss of control of the first switch, the second switch, and/or a fault in a local cell control board.

The predetermined fault type may be detected by means of one or more sensors arranged to sense a respective property of the cell which may indicate a cell fault. The predetermined fault type may be detected by means of arm current analysis. As an example. loss of control may include loss of communication between switch and control unit, or that switch is faulty, or that the control unit is faulty. The predetermined fault type may be any cell fault. The predetermined fault type may be a fault with the first switching branch, for instance a fault with the first switch or the second switch or both. The predetermined fault type may be a fault with a second switching branch if the cell comprises a second switching branch, for instance a fault with a third switch or a fourth switch or both. The predetermined fault type may be a fault of any control unit controlling operation of the cell. The predetermined fault type may be a fault in connection between two or more elements. The predetermined fault type may be any of these faults or include any combination of these faults.

According to one embodiment, the cell is a half-bridge cell or a full-bridge cell. The method may be applied to control operation of either half-bridge cell or full-bridge cell in a voltage source converter. The method may be applied to control operation of both half-bridge cell and full-bridge cell of a voltage source converter.

According to one embodiment, the method is applied to at least two cells arranged in respective arms of the voltage source converter. The method may be applied to one or more cells arranged in two or three arms of the voltage source converter. The method may be applied to any cells in either of, or both of, a first arm and a second arm in a leg of voltage source converter. The method may be applied to any cells in either of, or both of, a respective first arm and a respective second arm in respective legs of voltage source converter.

According to one embodiment, the method is applied to at least two cells arranged in the same arm of the voltage source converter. The method may be applied to two, three, four, five, six, seven, eight, nine, ten, or more cells in the same arm of the voltage source converter.

According to a second aspect, a control unit is provided. The control unit comprises means for performing the method according to the first aspect or any embodiments thereof. The control unit may be configured to perform the method according to the first aspect or any embodiments thereof. The control unit may include one or more gate control units for controlling the first switch, the second switch, additional switches in a second switching branch, and/or the bypass switch.

The control unit may include memory elements for storing measurements. The control unit may include one or more sensors for measuring one or more respective properties of the cell and/or the arm current. The control unit may comprise a bypass control unit and/or a bypass firing unit. The control unit may comprise a delay unit for introducing a predetermined delay in firing the bypass switch BPS.

According to a third aspect, a voltage source converter, such as a Modular Multilevel Converter, MMC, is provided. The voltage source converter comprises a plurality of cells and a control unit according to the second aspect or any embodiments thereof.

According to a fourth aspect, a computer program is provided. The computer program comprises instructions which, when the program is executed by a computer, cause the computer to carry out the method according to the first aspect or any embodiments thereof.

By computer, it may be meant any device capable of accepting and processing information for some result based on a program, software, or sequence of instructions on how the information is to be processed. The information may be in the form of digitalized data. As non-limiting examples, a computer may be a server, a stationary computing device, a portable computing device.

According to a fifth aspect, a computer-readable medium is provided. The computer readable medium comprises instructions which, when executed by a computer, cause the computer to carry out the method according to the first aspect or any embodiments thereof. The computer-readable medium may be any suitable medium for comprising instructions. The computer-readable medium may be a computer-readable storage medium.

Claimed embodiments are defined by the appended independent claims, with further embodiments being set forth in the appended dependent claims, in the following description and in the drawings.

BRIEF DESCRIPTION OF THE DRAWINGS

Embodiments will in the following be described in more detail with reference to the enclosed drawings, wherein.

DESCRIPTION OF EMBODIMENTS

Figure 1:
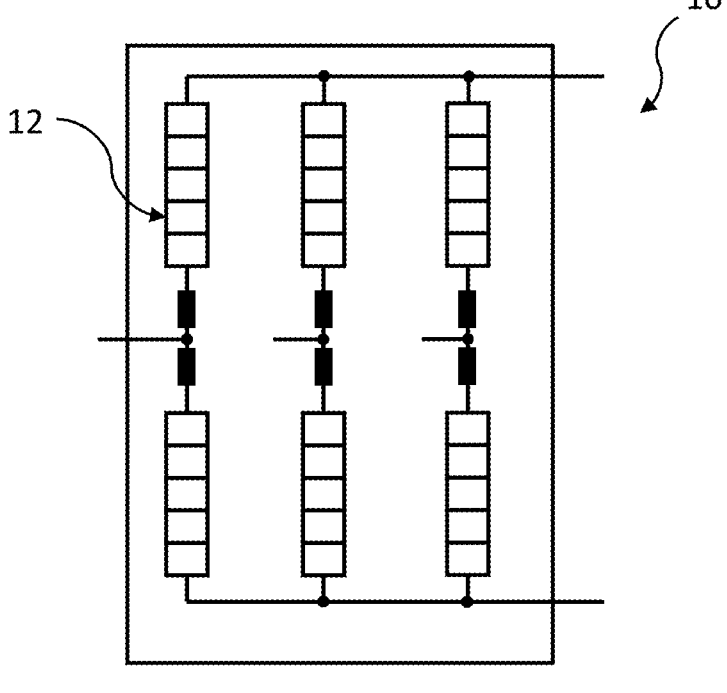
FIG. 1 shows a voltage source converter according to one embodiment.

Hereinafter, the principle and spirit of the present disclosure will be described with reference to the illustrative embodiments. It should be understood that all these embodiments are given merely for the person skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present subject matter provides a solution for reducing cell bypass component stress and preferably minimizing cell bypass component stress upon bypassing a cell when cell fault is detected. This inventive concept is partly realized as a method for controlling operation of one or more cells in an arm of a voltage source converter. This inventive concept is also realized as a control unit for performing the method. This inventive concept is also realized as a voltage source converter comprising cells and the control unit.

Figure 8:
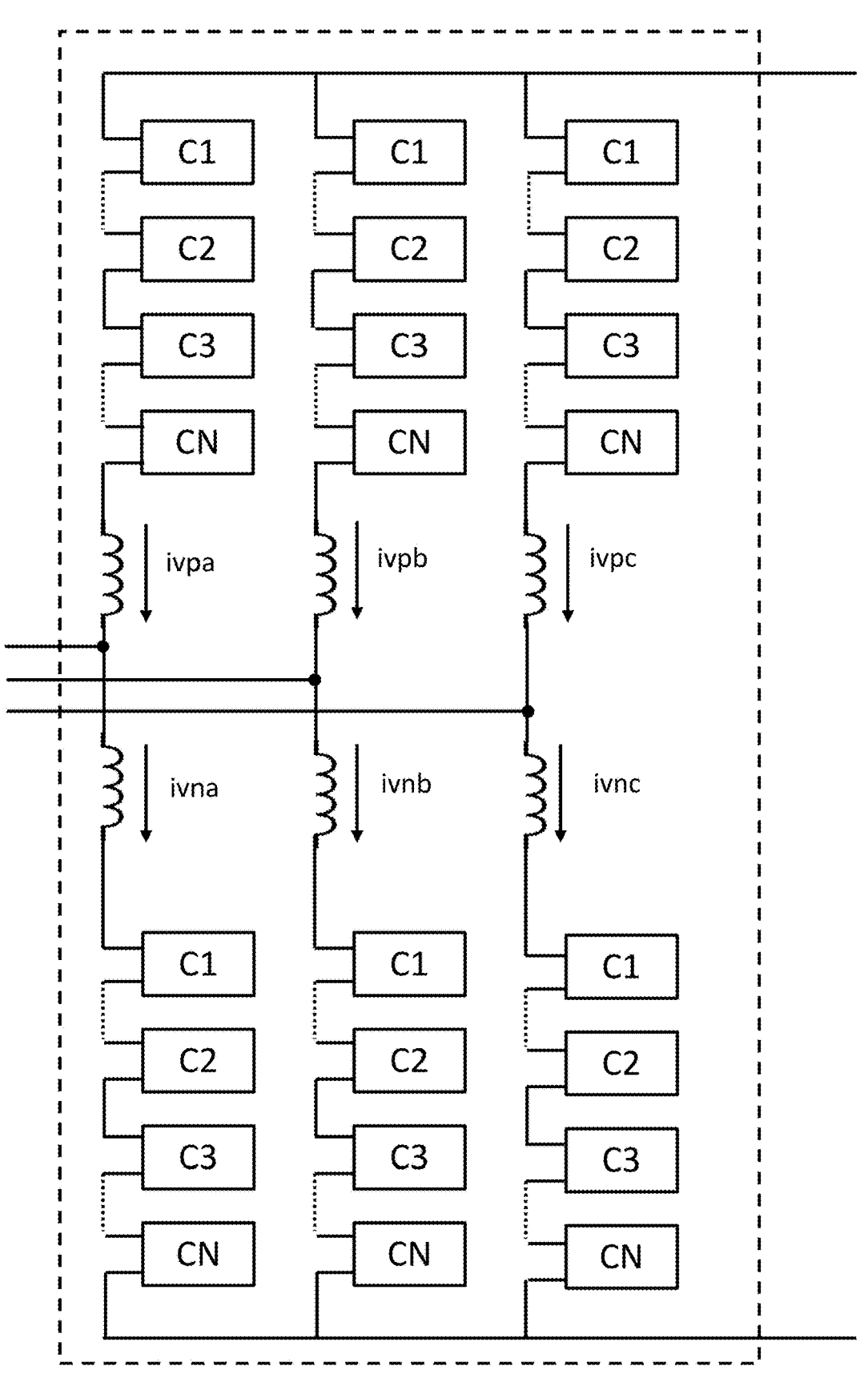
FIG. 8 is a schematic view of a voltage source converter according to one embodiment.

FIG. 1 shows a voltage source converter 10 comprising cells 12 arranged in three legs. Each leg may comprise two arms connected in series and providing a midpoint. By midpoint, it may be meant a location between two elements, it is not strictly referring to a location exactly in the middle of two elements. The midpoint of each leg may form an AC output of the voltage source converter 10. As there are three legs, the converter may be connected to a three-phase AC system. In each arm is a plurality of cells arranged in cascade as shown in FIG. 8. Operation of the cells C1, C2, . . . , CN in the voltage source converter may be controlled by means of the above-mentioned method. An arm current may be conducted through each arm, said arm current being associated with a respective phase of current.

The voltage source converter may be realized as a modular multilevel converter, MMC, as shown in FIG. 1. However, the above-mentioned method is not limited specifically to controlling operation of cells of any particular types of voltage source converters although the method may result in specific advantages for particular types of voltage source converters. The phase legs may be wye- or delta-connected, where the junction between two phase legs is connected to a corresponding phase of a three-phase AC system.

The voltage source converter may be a power converter as e.g., used in HVDC power transmission, FACTS systems or static frequency converter systems.

A cell 12 may be a full-bridge cell or a half-bridge cell. In the figures, the cells are exemplified as half-bridge cells. It should however be understood that the cells may be full-bridge cells. A cell comprises energy storage elements and switches configured to insert the energy storage elements with one out of a maximum of two different polarities in a phase leg or to bypass the energy storage element. The energy storage element in one or more of the cells may be a capacitor. Each cell may then have a cell voltage. This cell voltage is inserted in the phase leg or bypassed in order to form a waveshape.

In one variation of the voltage source converter 10, one or more phase legs comprises full-bridge cells. In another variation, each phase leg comprises full-bridge cells. In yet another variation, one or more phase legs comprises half-bridge cells. In yet another variation, each phase leg comprises half-bridge cells. In yet another variation, one or more phase legs comprises a mixture of full-bridge cells and half-bridge cells. In yet another variation, each phase leg comprises a mixture of full-bridge cells and half-bridge cells.

Figure 2:
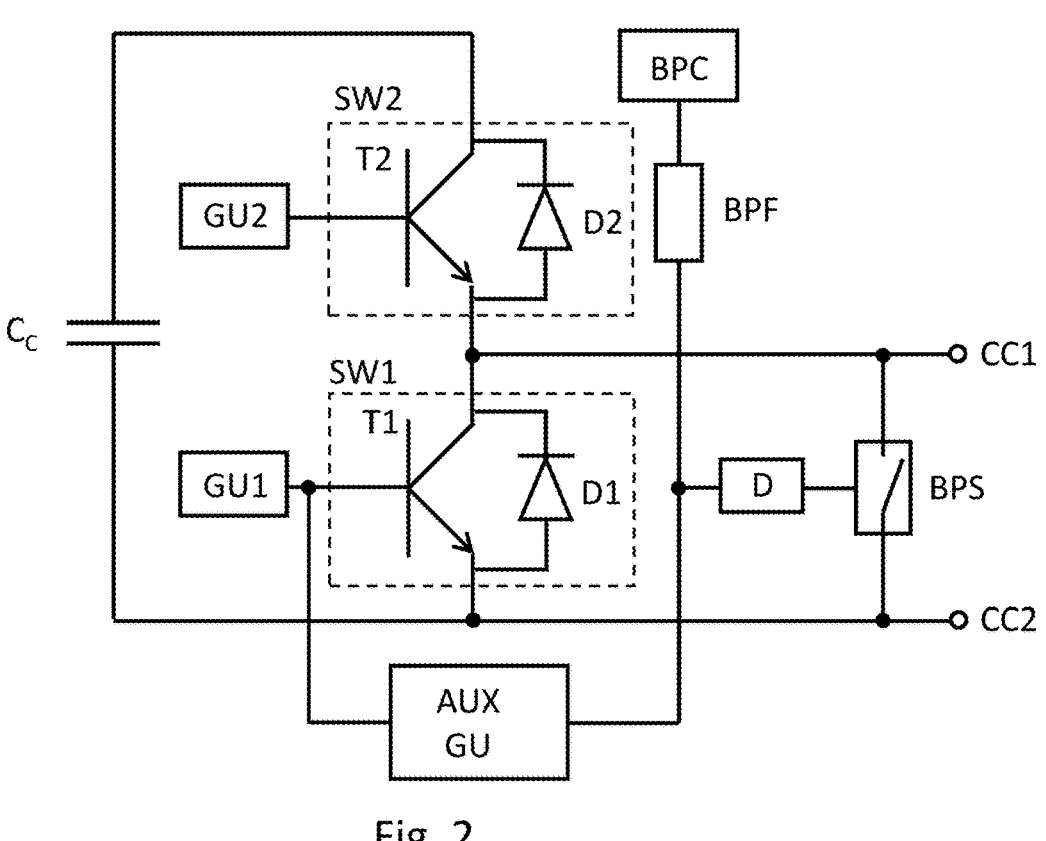
FIGS. 2-7 show respective cells according to embodiments.
Figure 3:
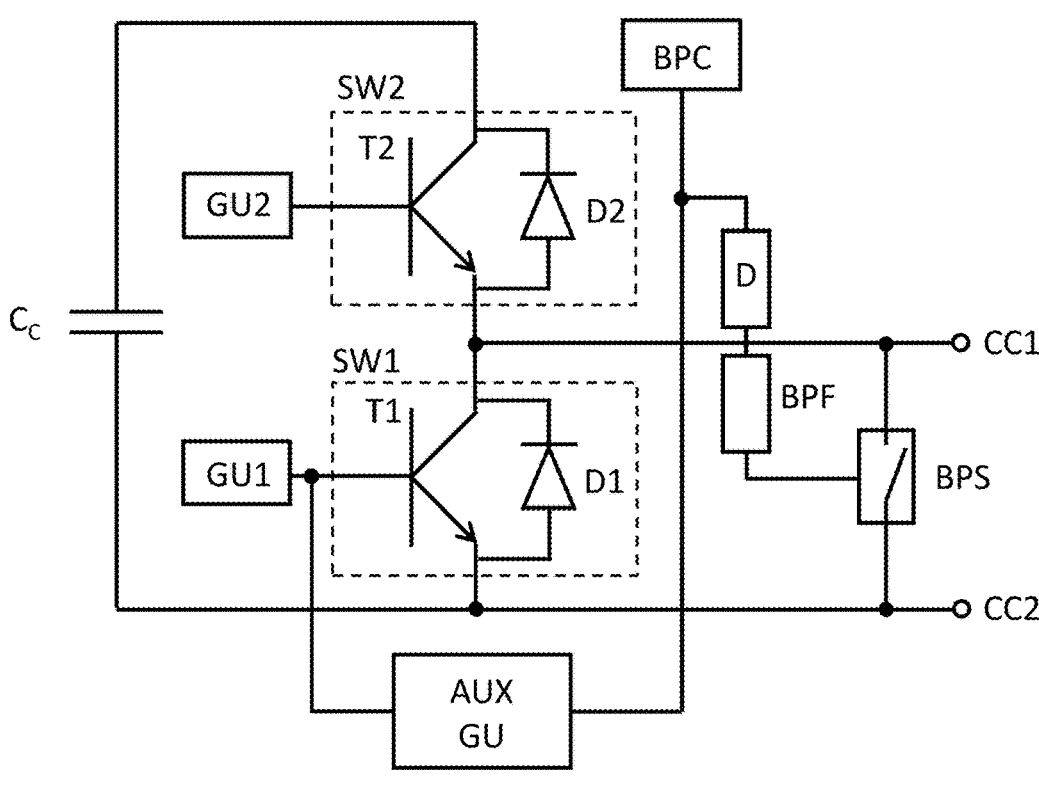

In reference to e.g., FIGS. 2 and 3, a cell 12 for which operation may be controlled by the above-mentioned method comprises a first cell connection terminal CC1 and a second cell connection terminal CC2. The cell 12 further comprises a first switching branch and an energy storage element which in FIGS. 2 and 3 is exemplified as a capacitor $C_c$. The switching branch is connected to the energy storage element $C_c$. The switching branch comprises a first switch SW1 and a second switch SW2 connected in series. One of the first and second cell connection terminals CC1, CC2 is arranged between the first switch SW1 and the second switch SW2. In FIGS. 2 and 3, it is here exemplified that the first cell connection terminal CC1 is arranged between the first switch SW1 and the second switch SW2. The second cell connection terminal CC2 is arranged between the energy storage element $C_c$ and the first switch SW1. As an alternative, the first cell connection terminal CC1 is arranged between the energy storage element $C_c$ and the second switch SW2 and the second cell connection terminal CC2 is arranged between the first switch SW1 and the second switch SW2 (compare FIGS. 4-5 with FIGS. 6-7).

The first switch SW1 and the second switch SW2 are exemplified as comprising a transistor T1, T2 and an anti-parallel diode D1, D2.

Either transistor of the first and second switches may be any suitable semiconductor component (or "semiconductor"). As non-limiting examples, suitable semiconductor components may include Silicon Carbide Metal Oxide Semiconductor Field Effect Transistors (SiC MOSFETs) and other active gate controllable devices, Insulated Gate Bipolar Transistors (IGBTs) or Bi-Mode Insulated Gate Transistors (BiGT). The kind of semiconductor component used does not limit the method; rather the method may be applicable for controlling operation of cells incorporating any semiconductors which are suitable to cover the needs of a power converter. The first switch SW1 may be connected to a low potential end of energy storage element or a branch of energy storage elements, while the second switch SW2 may be connected to a high potential end of said energy storage element or branch of energy storage elements. The first switch SW1 may be connected to a high potential end of energy storage element or a branch of energy storage elements, while the second switch SW2 may be connected to a low potential end of said energy storage element or branch of energy storage elements.

Diodes D1, D2 of the switches SW1, SW2 may be connected antiparallel to a conducting direction of the respective transistor T1, T2. The diode may additionally be an integral part of the transistor (power transistor).

Transistors allows for current flow in one direction, in this case from collector to emitter. The diode as a semiconductor component allows for a current flow in a direction opposite to the direction which the transistor T1 and T2 allow. Preferably, the diode is adapted to bear the same power (or current) as the transistor.

The transistors T1 and T2 of the switches SW1 and SW2 are in steady-state operation activated through corresponding primary gate control units GU1 and GU2 that apply voltages capable of changing switch states. A first primary gate control GU1 may connect to the gate of the first transistor T1 in the first switch SW1 and control operation thereof. A second primary gate control GU2 may connect to the gate of the second transistor T2 in the second switch SW2 and control operation thereof.

The cell 12 also comprises a bypass switch BPS. In FIGS. 2-3, the bypass switch BPS is exemplified as being connected between the first cell connection terminal CC1 and the second cell connection terminal CC2 to be able to close a connection between the first connection terminal CC1 and the second connection terminal CC2. The bypass switch BPS is also connected such that the first switch SW1 is connected in parallel with the bypass switch BPS, thereby providing a parallel switch SW1. Alternatively, the bypass switch BPS may be connected such that the second switch SW2 is connected in parallel with the bypass switch BPS, thereby providing a parallel switch SW2 (see FIGS. 6-7).

The bypass switch BPS may be realized as a mechanical switch. The bypass switch BPS may be controlled to bypass the whole cell when the cell has become faulty. Through the addition of the bypass switch BPS, it may be possible to continue use of the converter despite the cell being faulty.

Figure 4:
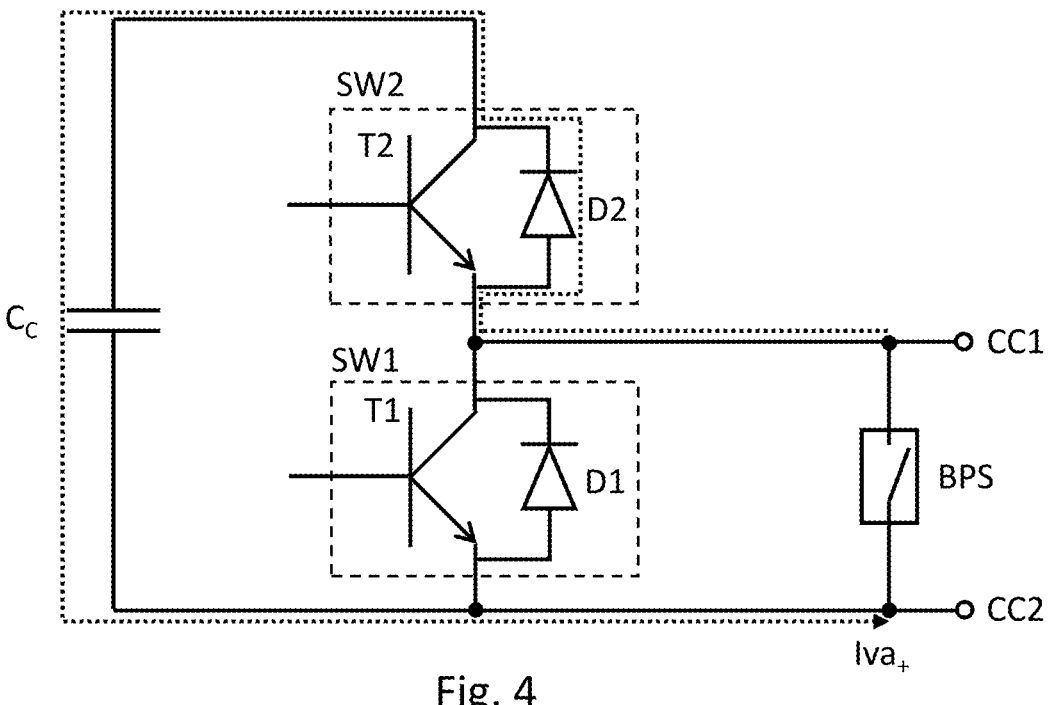
Figure 5:
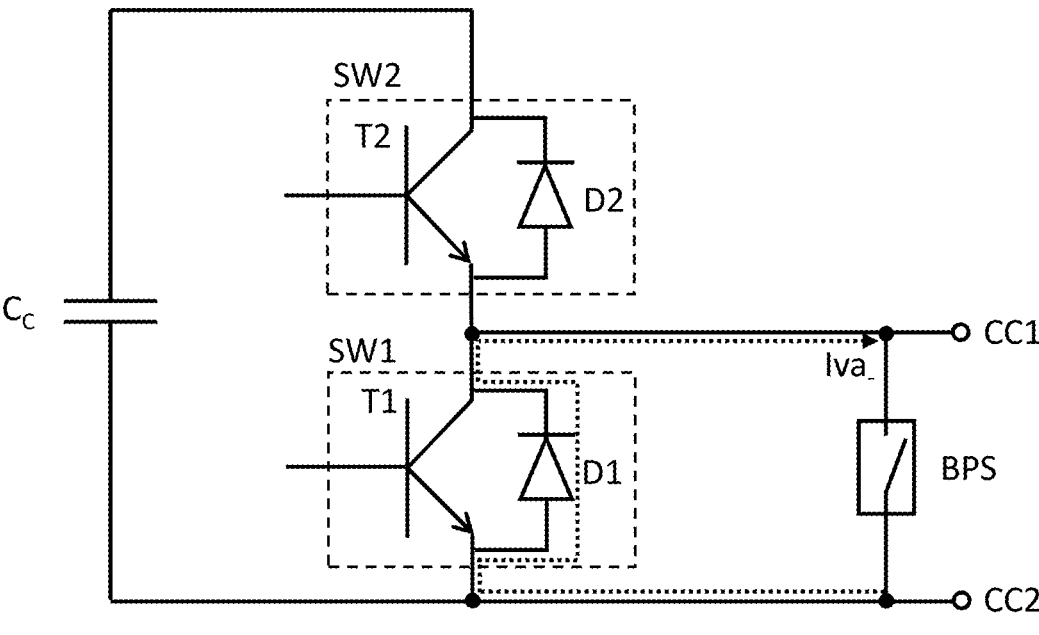

As shown in FIGS. 4-5, the cell 12 is adapted such that when the transistors T1, T2 of both the first and second switches SW1, SW2 are turned OFF, the cell 12 conducts an arm current between the first and second cell connection terminals CC1, CC2 via the first diode D1 of the first switch SW1 connected in parallel with the bypass switch BPS for a negative arm current Iva− and via the diode D2 of the second switch SW2 for a positive arm current Iva+.

Figure 6:
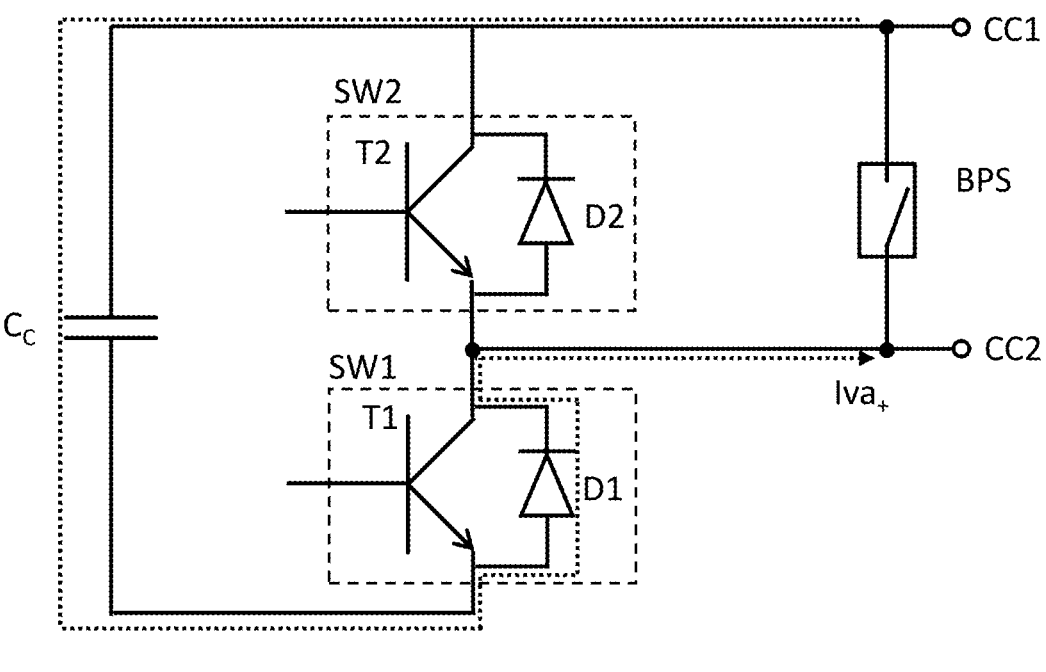
Figure 7:
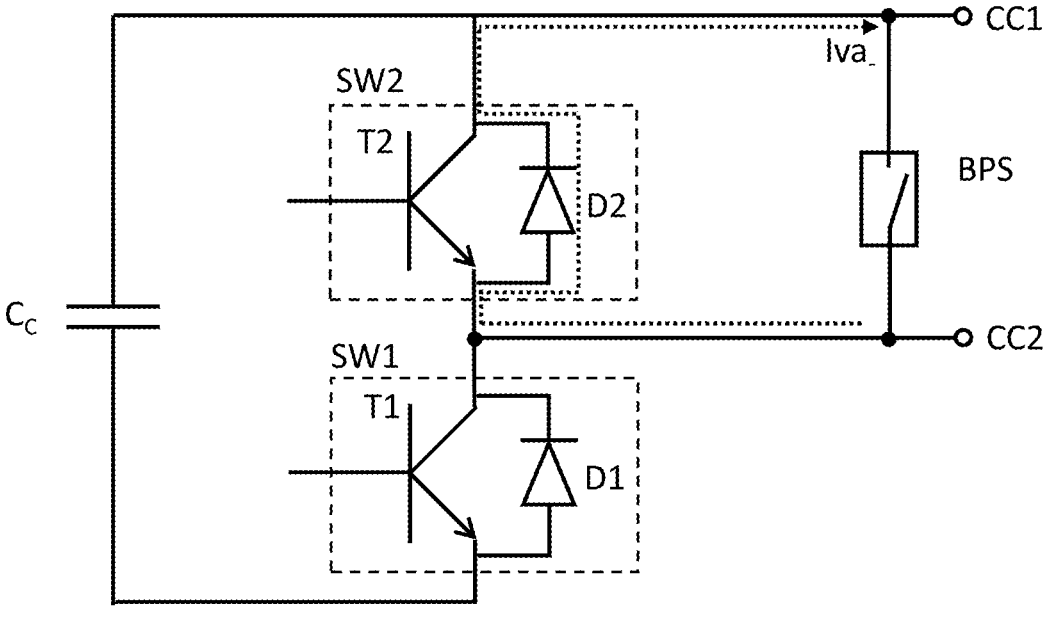

As an alternative, as shown in FIGS. 6-7, the cell 12 is adapted such that when the transistors T1, T2 of both the first and second switches SW1, SW2 are turned off, the cell 12 conducts an arm current between the first and second cell connection terminals CC1, CC2 via the second diode D2 of the first second SW2 connected in parallel with the bypass switch BPS for a negative arm current Iva− and via the diode D1 of the first switch SW1 for a positive arm current Iva+.

As can be seen from FIGS. 4-5, a large discharge current may flow from the energy storage element Cc if the bypass switch BPS is closed when a positive arm current Iva+ flows through the cell 12 but no such large discharge current may flow from the energy storage element Cc if the bypass switch BPS is closed when a negative arm current Iva-flows through the cell 12. The case is the opposite for the alternative shown in FIGS. 6-7.

Figure 11:
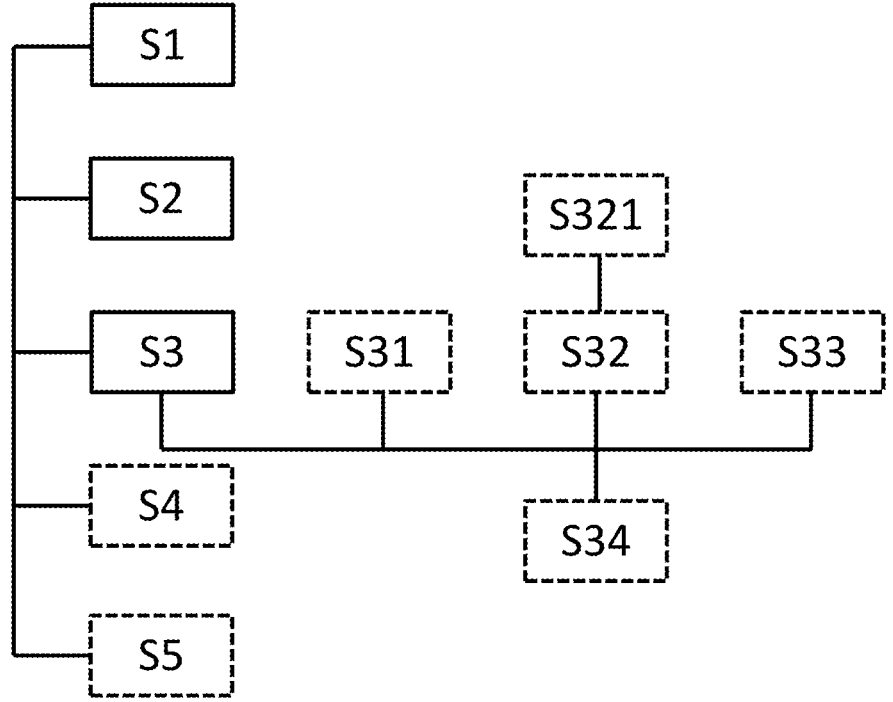
FIG. 11 is a schematic view of a method according to one embodiment.

Thus, in light of the above insight of cell operation and cell discharge, the above-mentioned method is provided, which method is for controlling operation of a cell 12 arranged in an arm of a voltage source converter 10, said cell 12 being a cell 12 as explained above. The method is schematically illustrated in FIG. 11 and comprises:

upon detection of a predetermined fault type in the cell 12, depending on an average current in said arm during one period of fundamental frequency and on an operation mode of the voltage source converter, injecting S1 a predefined circulating current into said arm;

detecting S2 a time period during which the arm current is in the negative arm current direction Iva−, and controlling S3 the bypass switch BPS such that it closes within said time period.

By controlling the bypass switch BPS such that it closes within said time period, the bypass switch BPS always closes when the arm current flows between the first connection terminal CC1 and the second connection terminal CC2 via the diode D1, D2 of the switch SW1, SW2 connected in parallel with the bypass switch BPS. As explained above, depending on configuration of the cell 12, this diode may be either the first diode D1 or the second diode D2. This then prevents a large discharge current from flowing through the bypass switch BPS at the moment it is closed. This reduces cell bypass component stress and allows for the bypass switch BPS to be dimensioned for smaller currents (it no longer has to withstand MA short circuit currents), which then reduces complexity and cost of the bypass switch BPS.

The predetermined fault type may include a loss of control of the first switch SW1, the second switch SW2, and/or a fault in a local cell control board. Loss of control may include loss of communication, i.e., a switch is operational but cannot be communicated with. Loss of control may include operational failure, i.e., communication with a switch is enabled but the switch does not operate according to provided instructions.

The predetermined fault type may be detected by means of an analysis of arm current. Said analysis of arm current may involve determining an average of arm current in said arm during one period of fundamental period, or other suitable period, and check whether a measured average arm current deviates from an expected average arm current.

The method may further comprise:

providing S4 an arm current measurement measured by means of a current sensor, and determining S5 an arm current direction of the arm current from the arm current measurement.

By this, specific measurement of arm current and arm current direction may be provided. This may be more accurate than relying on inferring arm current and arm current direction via other measurements.

Alternatively, or in combination with analysis of arm current, the predetermined fault type may be detected by means of one or more sensors arranged to sense properties of the cell.

The pre-defined circulation current may be injected if the converter is operating in inverter mode, optionally at a power level of, or higher than 0.2 PU voltage. Said power level is however a non-limiting example and other power levels may be suitable. Injection of the pre-defined circulation current may be omitted otherwise, for instance if the converter is operating in rectifier mode. Said injecting a pre-defined circulating current into said arm may be performed before the bypass switch is closed. Injecting said pre-defined circulating current may limit or prevent energy storage element Cc from being charged to a too high level. By keeping the charging level at a satisfactory level even during a cell fault, cell bypass component stress may be reduced.

Figure 9:
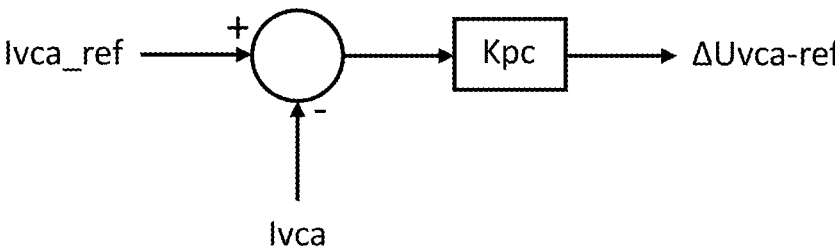
FIG. 9 is a schematic view of an aspect according to one embodiment.

As shown in FIG. 9, control of circulating current for one phase of the voltage source converter may involve using a proportional type regulator with an arm current reference and a measured circulating current as inputs, which then gives as output a delta voltage which can be added to a voltage reference of the corresponding phase generated from a system control of the voltage source converter.

Said controlling S3 the bypass switch BPS such that it closes within said time period may include:

sending S31 a control signal to the bypass switch BPS to close the bypass switch BPS, and timing S32 the control signal so that it compensates for a transmission time of the control signal and a closing time of the bypass switch BPS.

As indicated in FIGS. 2-3, the bypass switch BPS may be controlled to close by means of a bypass control unit BPC and a bypass firing unit BPF. One or more of a delay unit D, an auxiliary gate control unit AUX GU may also be used for controlling operation of a cell 12.

The bypass control unit BPC provides or generates a control signal that is an actuating signal of the bypass switch BPS. The control signal emitted by the bypass control unit BPC may be a logical signal. The control signal emitted by the bypass control unit BPC may be an actuating signal of the bypass switch.

As a non-limiting example, the control signal may also be used to trigger the operation of the auxiliary gate control unit AUX GU. The control signal may be supplied to the auxiliary gate control unit AUX GU, which in turn applies a gate control signal to the gate of the first transistor T1 of the first switch SW1 based on the reception of the control signal. The gate control signal may cause the first switch SW1 to turn OFF.

The control signal from the bypass control unit BPC may also branch off to the bypass firing unit BPF via a delay unit D in order to make the bypass firing unit BPF apply a controlling voltage to the bypass switch BPS, where the delay unit D introduces a delay in the delivery of the control signal to the bypass firing unit BPF. The actuation of the bypass switch BPS may therefore also be delayed in relation to the operation performed by the auxiliary gate control unit AUX GU. The control signal is provided for closing the bypass switch BPS in dependence on the detection of a cell fault or a predetermined cell fault type. The bypass firing unit BPF is configured to operate the bypass switch BPS based on the control signal. The auxiliary gate control unit AUX GU, which is according to a non-limiting example connected to the gate of the first transistor T1 of the first switch SW1, is in turn configured to apply a gate control signal capable of making the first transistor T1 of the first switch SW1 conduct, at least as long as the bypass switch remains unclosed, upon the detection of a cell fault.

Upon detection of cell fault, the bypass control unit BPC may cause firing of the bypass switch BPS after a delay such that the bypass switch BPS closes when the arm current direction is in the desired direction, meaning the parallel switch conducts the arm current via a diode.

Although these control elements for controlling the bypass switch are explained in relation to the first switch SW1, it should be understood that the cell may be configured such that the auxiliary gate control unit AUX GU connects to the second switch SW2 instead (when the second switch SW2 is connected in parallel with the bypass switch BPS as shown in FIGS. 6-7).

Moreover, it should be understood that the auxiliary gate control unit AUX GU is optional and may be removed from any embodiments.

Said timing 32 the control signal may include:

sending S321 the control signal to the bypass switch BPS during a time period when an arm current direction of the arm current flows in the opposite direction relative the arm current direction for which the bypass switch BPS is to be closed.

For instance, the cell 12 may be adapted so that the bypass switch BPS is configured to be closed when the arm current flows in a negative arm current direction. Negative arm current direction may be in a direction from the second cell connection terminal CC2 to the first cell connection terminal CC1, whereas a positive arm current direction may be in a direction from the first cell connection terminal CC1 to the second cell connection terminal CC2. Then, the control signal may be sent when the arm current flows in a positive arm current direction.

By this, the control signal may advantageously arrive and initiate a bypass switch BPS as soon as the arm current flow changes to the desired arm current direction. This results in a more responsive solution upon detected cell fault, which may then improve performance of the voltage source converter.

The method may further comprise:

based on a waveform of the arm current, estimating S33 a first zero-crossing timepoint tz1 corresponding to a timepoint when the arm current direction changes from the positive arm current direction Iva+ to the negative arm current direction Iva– and a second zero-crossing timepoint tz2 corresponding to a timepoint when the arm current direction changes from the negative arm current direction Iva– to the positive arm current direction Iva+, and sending S34 a control signal to close the bypass switch BPS such that the bypass switch closes no earlier than at the first zero-crossing timepoint tz1 and no later than at the second zero-crossing timepoint tz2.

Figure 10:
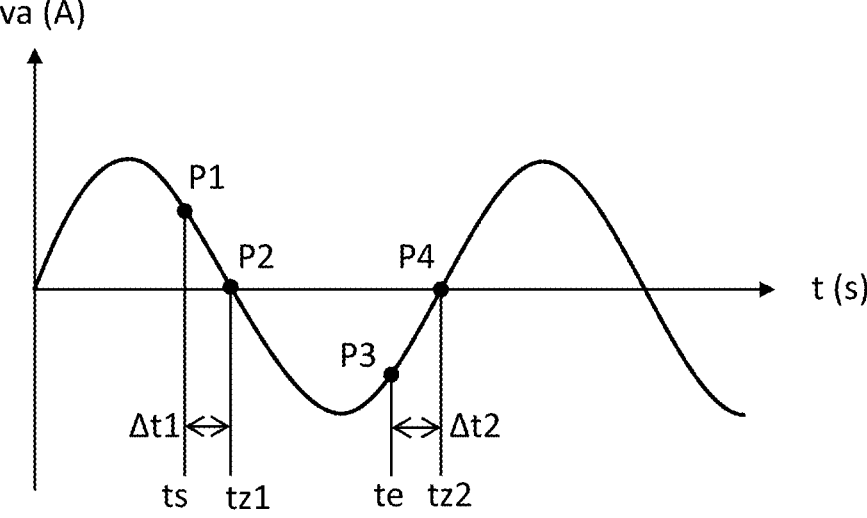
FIG. 10 is a graph indicating current over time of a cell for which operation thereof is controlled according to one embodiment.

FIG. 10 shows an example waveform of the arm current Iva. A first zero-crossing point P2 is herein shown, which corresponds to a first zero-crossing timepoint tz1 when the arm current changes polarity from positive to negative. A second zero-crossing point P4 is herein also shown, which corresponds to a second zero-crossing timepoint tz2 when the arm current changes polarity from negative to positive. These points may be estimated by analyzing the waveform of the arm current in terms of rate of change over one or more time-intervals prior to said timepoints tz1, tz2. As an example, zero-crossing timepoints may be approximated based on time intervals Δt1, Δt2 for which rate of change is substantially constant. In FIG. 10, a first time-interval is Δt1 which approximately starts at a timepoint ts, and a second time interval is Δt2 which approximately starts at a timepoint te. By this, the zero-crossing timepoints may be estimated in a reliable and fast manner. It should however be understood that zero-crossing timepoints may be approximated by other methods as well.

The control and gate control units were above described in relation to half-bridge cells. It should be realized that the principles described herein may just as well be applied in full-bridge cells. In this case there may be a second switching branch comprising a third and a fourth series-connected switch and a third and a fourth primary control unit for controlling the third and fourth switch, where the second switching branch is connected in parallel with the energy storage element or an energy storage branch comprising a plurality of energy storage elements and the second cell connection terminal is provided between the third and fourth switch. In this case, it is possible that there is a first further secondary gate control unit connected to one of the switches of the second switching branch and configured to, upon detection of a predetermined cell fault type, apply a gate control signal causing the one of the switches of the second switching branch to conduct at least as long as the bypass switch remains unclosed. There may additionally be a second further secondary gate control unit connected to the other of the switches of the second switching branch configured to, upon detection of a fault, apply a gate control signal causing this other switch of the second switching branch to conduct at least as long as the bypass switch remains unclosed. The operation of both the further secondary gate control units may also be triggered by an actuating signal of the bypass switch.

While the foregoing is directed to embodiments of the disclosure, other and further embodiments may be devised without parting from the inventive concept discussed herein. The scope of claimed embodiments is however determined by the claims.

The invention claimed is:

1. A method for controlling operation of a cell arranged in an arm of a voltage source converter, said arm being associated with a current phase in said voltage source converter, the cell comprising:
   a first cell connection terminal;
   a second cell connection terminal;
   a first switching branch comprising a first switch and a second switch connected in series, wherein one of the first and second cell connection terminals is arranged between the first switch and the second switch, the first and second switches each comprising a transistor and an anti-parallel diode;
   a bypass switch connected between the first and second cell connection terminals and connected such that the first switch or the second switch is connected in parallel with the bypass switch;
   the cell adapted such that when the transistors of both the first and second switches are turned off, the cell conducts an arm current between the first and second cell connection terminals via the diode of the switch connected in parallel with the bypass switch for a negative arm current direction of the arm current and via the diode of the other switch of the first and second switches for a positive arm current direction of the arm current,
the method comprising:
   upon detection of a predetermined fault type in the cell, depending on an average current in said arm during one period of fundamental frequency and on an operation mode of the voltage source converter, injecting a pre-defined circulating current into said arm;
   detecting a time period during which the arm current is in the negative arm current direction, and
   controlling the bypass switch such that it closes within said time period.

2. The method according to claim 1, wherein said injecting a pre-defined circulating current into said arm is performed if the converter is operating in inverter mode.

3. The method according to claim 1, wherein said injecting a pre-defined circulating current into said arm is performed before the bypass switch is closed.

4. The method according to claim 1, wherein the negative arm current direction is a direction from the second cell connection terminal to the first cell connection terminal.

5. The method according to claim 1, wherein the positive arm current direction is a direction from the first cell connection terminal to the second cell connection terminal.

6. The method according to claim 1, comprising:
   providing an arm current measurement measured by means of a current sensor, and
   determining an arm current direction of the arm current from the arm current measurement.

7. The method according to claim 1, wherein said controlling the bypass switch such that it closes within said time period includes:
   sending a control signal to the bypass switch to close the bypass switch (BPS), and
   timing the control signal so that it compensates for a transmission time of the control signal and a closing time of the bypass switch.

8. The method according to claim 7, wherein said timing the control signal includes:
   sending the control signal to the bypass switch during a time period when the arm current direction of the arm current is in the positive arm current direction,
   controlling the bypass switch such that it closes when the arm current direction of the arm current is in the negative arm current direction.

9. The method according to claim 7, comprising:
   based on a waveform of the arm current, estimating a first zero-crossing timepoint corresponding to a timepoint when the arm current direction changes from the positive arm current direction to the negative arm current direction and a second zero-crossing timepoint corresponding to a timepoint when the arm current direction changes from the negative arm current direction to the positive arm current direction, and
   sending a control signal to close the bypass switch such that the bypass switch closes no earlier than at the first zero-crossing timepoint and no later than at the second zero-crossing timepoint.

10. The method according to claim 1, wherein said predetermined fault type is a loss of control of the first switch, the second switch, and/or a fault in a local cell control board.

11. The method according to claim 1, wherein the cell is a half-bridge cell or a full bridge cell.

12. The method according to claim 1, wherein the method is applied to at least two cells arranged in respective arms of the voltage source converter.

13. The method according to claim 1, wherein the method is applied to at least two cells arranged in the same arm of the voltage source converter.

14. A control unit comprising means for performing the method according to claim 1.

15. A voltage source converter, comprising a plurality of cells and a control unit according to claim 14.

16. The voltage source converter according to claim 15, wherein the voltage source converter is a modular multilevel converter (MMC).

17. The method according to claim 1, wherein said injecting a pre-defined circulating current into said arm is performed if the converter is operating in inverter mode, at a power level of, or higher than, 0.2 PU voltage.

18. The method according to claim 1, wherein the cell is a full-bridge cell.

* * * * *